US012605745B2

(12) United States Patent
Lin

(10) Patent No.: US 12,605,745 B2
(45) Date of Patent: Apr. 21, 2026

(54) RINSING DEVICE FOR RINSING BLUE FILM AT BOTTOM OF WAFER

(71) Applicant: YAYATECH CO., LTD., Hsinchu City (TW)

(72) Inventor: En-Ning Lin, Hsinchu City (TW)

(73) Assignee: YAYATECH CO., LTD., Hsinchu City (TW)

( * ) Notice: Subject to any disclaimer, the term of this patent is extended or adjusted under 35 U.S.C. 154(b) by 157 days.

(21) Appl. No.: 18/589,162

(22) Filed: Feb. 27, 2024

(65) Prior Publication Data

US 2025/0018439 A1 Jan. 16, 2025

(30) Foreign Application Priority Data

Jul. 10, 2023 (TW) ................................ 112125709

(51) Int. Cl.

| | |
|---|---|
| ***B08B 3/04*** | (2006.01) |
| ***B08B 1/14*** | (2024.01) |
| ***B08B 1/16*** | (2024.01) |
| ***B08B 1/20*** | (2024.01) |
| ***B08B 1/34*** | (2024.01) |

(52) U.S. Cl.

CPC ................ *B08B 3/041* (2013.01); *B08B 1/14* (2024.01); *B08B 1/165* (2024.01); *B08B 1/20* (2024.01); *B08B 1/34* (2024.01)

(58) Field of Classification Search

CPC .... B08B 1/12; B08B 1/14; B08B 1/16; B08B 1/165; B08B 1/20; B08B 1/34; B08B 3/041; B08B 11/00; B08B 11/04; H01L 21/0209; H01L 21/67017; H01L 21/67023; H01L 21/67028; H01L 21/6704; H01L 21/67046; H01L 21/67092; H01L 21/67132; H01L 21/6836

See application file for complete search history.

(56) References Cited

FOREIGN PATENT DOCUMENTS

| | | | |
|---|---|---|---|
| CN | 208033112 U * | 11/2018 | |
| GB | 2063765 A * | 6/1981 | ............. B41F 35/06 |
| TW | I630668 | 7/2018 | |

OTHER PUBLICATIONS

Machine Translation of Zheng, CN-208033112-U, Nov. 2018. (Year: 2018).*

* cited by examiner

*Primary Examiner* — David G Cormier

(74) *Attorney, Agent, or Firm* — MUNCY, GEISSLER, OLDS & LOWE, P.C.

(57) ABSTRACT

A rinsing device for rinsing a blue film at the bottom of a wafer, including: a base; a water tank; at least one drum disposed in the water tank and partially exposed and vertically protruded from the water tank; at least one drum driver; two vertically-movable scraper sets disposed at the base, flanking the water tank, and each having a scraper, a water collection chamber and a vertically-movable driver, with the scraper disposed above the water collection chamber, the water collection chamber disposed at the vertically-movable driver, and the vertically-movable driver disposed at the base and adapted to drive the water collection chamber and the scraper moving vertically; and a water tray disposed at the base, positioned at the water tank, and positioned below the two scrapers and the two water collection chambers.

8 Claims, 6 Drawing Sheets

RINSING DEVICE FOR RINSING BLUE FILM AT BOTTOM OF WAFER

BACKGROUND OF THE INVENTION

1. Field of the Invention

The present disclosure relates to rinsing technology for use after wafer inspection, and more particularly to a rinsing device for rinsing a blue film at a bottom of a wafer.

2. Description of Related Art

Taiwan patent 1630668 discloses a rinsing device of a wafer inspection equipment to remove a liquid-state medium applied to a blue film at the bottom of a wafer upon completion of an inspection of the wafer, as the refractive index of the medium approximates that of the blue film to enable clear images to be obtained. Taiwan patent 1630668 discloses allowing a wafer to move relative to a drum, allowing a wetted drum to rub against and rinse the blue film at the bottom of the wafer in the course of the movement, and allowing water to be scraped from the surface of the blue film with a scraper.

However, in practice, the medium adhered to the blue film at the bottom of the wafer in the course of the movement can rarely be removed through one single instance of rinsing but has to be removed through multiple instances of rinsing. Furthermore, the aforesaid technology is disadvantaged by the fact that one-way wafer movement is required for a wetted drum to rub against and rinse the blue film and then water to be scraped therefrom; as a result, upon completion of an instance of movement of a wafer relative to a drum, the wafer has to be lifted and then returned to the pre-rinsing position before undergoing the next instance of rinsing. As a result, rinsing does not occur while the wafer is moving to the next pre-rinsing position. Therefore, the prior art is time inefficient and thus dissatisfactory.

BRIEF SUMMARY OF THE INVENTION

It is an objective of the disclosure to provide a rinsing device for rinsing a blue film at a bottom of a wafer to clean the blue film at the bottom of the wafer during the whole forward journey and the whole backward journey of the wafer, achieving optimal rinsing efficiency.

To achieve the above and other objectives, the disclosure provides a rinsing device for rinsing a blue film at a bottom of a wafer, comprising: a base; a water tank disposed at the base, having an opening facing upward, and adapted to contain water; at least one drum, with its long axis extending in a front-rear direction, disposed at the water tank, wherein a portion of the at least one drum is disposed in the water tank, and another portion of the at least one drum is exposed from the opening and vertically protruded from the water tank; at least one drum driver disposed at the base, connected to the at least one drum, and adapted to drive the at least one drum rotating; two vertically-movable scraper sets disposed at the base, flanking the water tank, and each having a scraper, a water collection chamber and a vertically-movable driver, with the scraper disposed above the water collection chamber, and the water collection chamber disposed at the vertically-movable driver, wherein the vertically-movable driver is disposed at the base and adapted to drive the water collection chamber and the scraper moving vertically; and a water tray disposed at the base, positioned at the water tank, and positioned below the two scrapers and the two water collection chambers.

Therefore, the disclosure discloses cleaning a blue film at the bottom of a wafer during the whole forward journey and the whole backward journey of the wafer, achieving optimal rinsing efficiency.

DETAILED DESCRIPTION OF THE INVENTION

Figure 1:
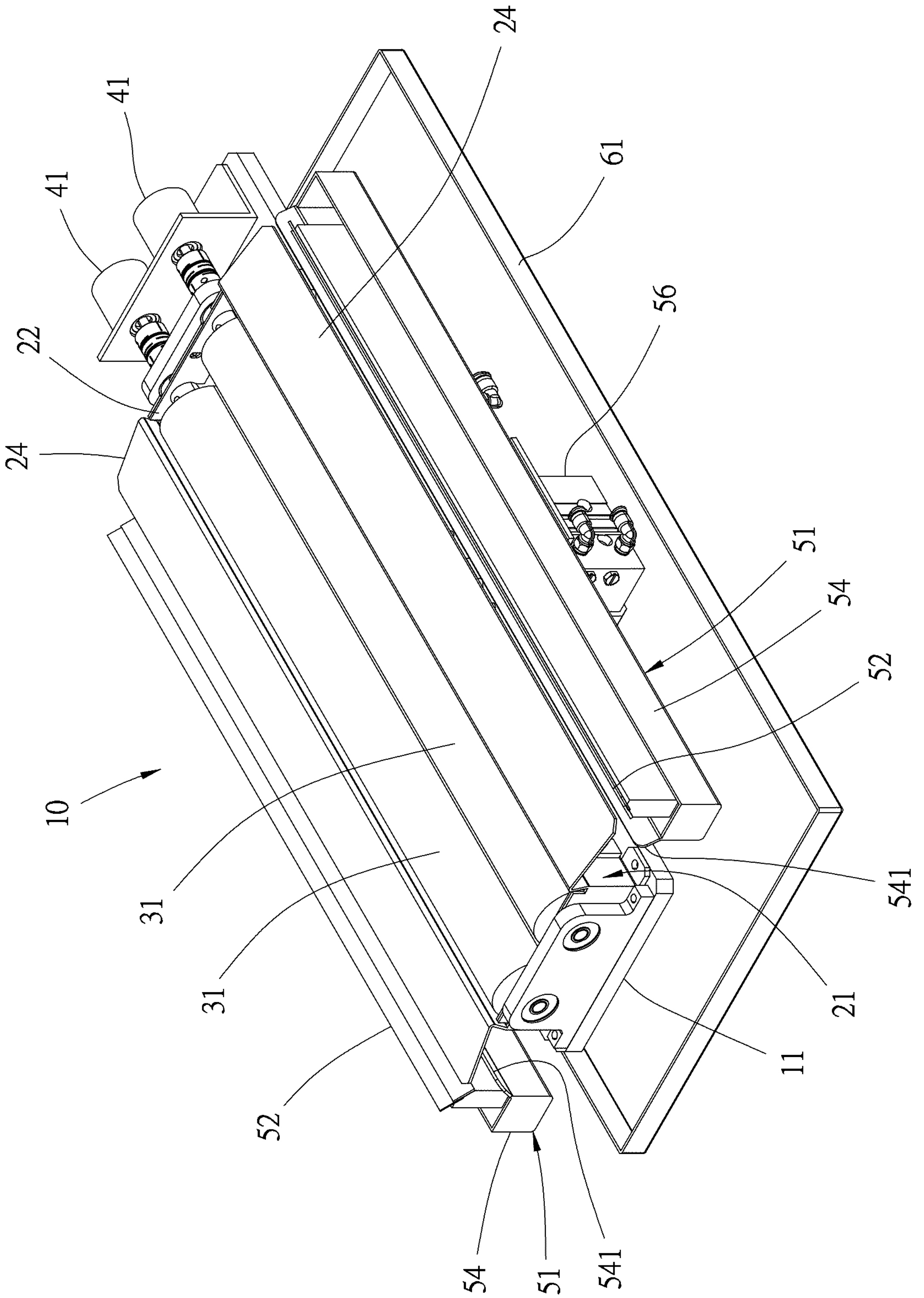
FIG. 1 is a perspective view according to the first preferred embodiment of the disclosure.
Figure 2:
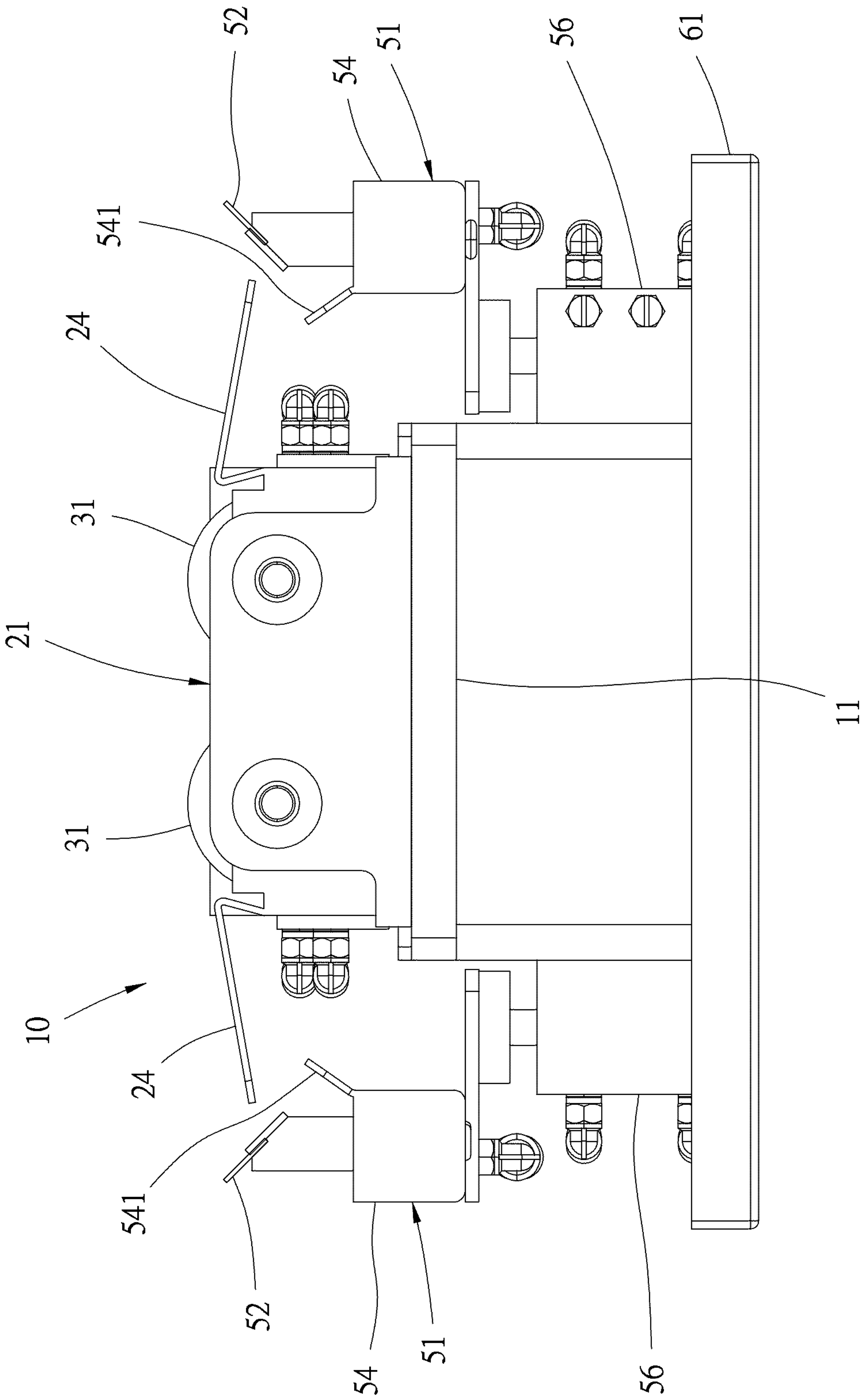
FIG. 2 is a front view according to the first preferred embodiment of the disclosure.
Figure 3:
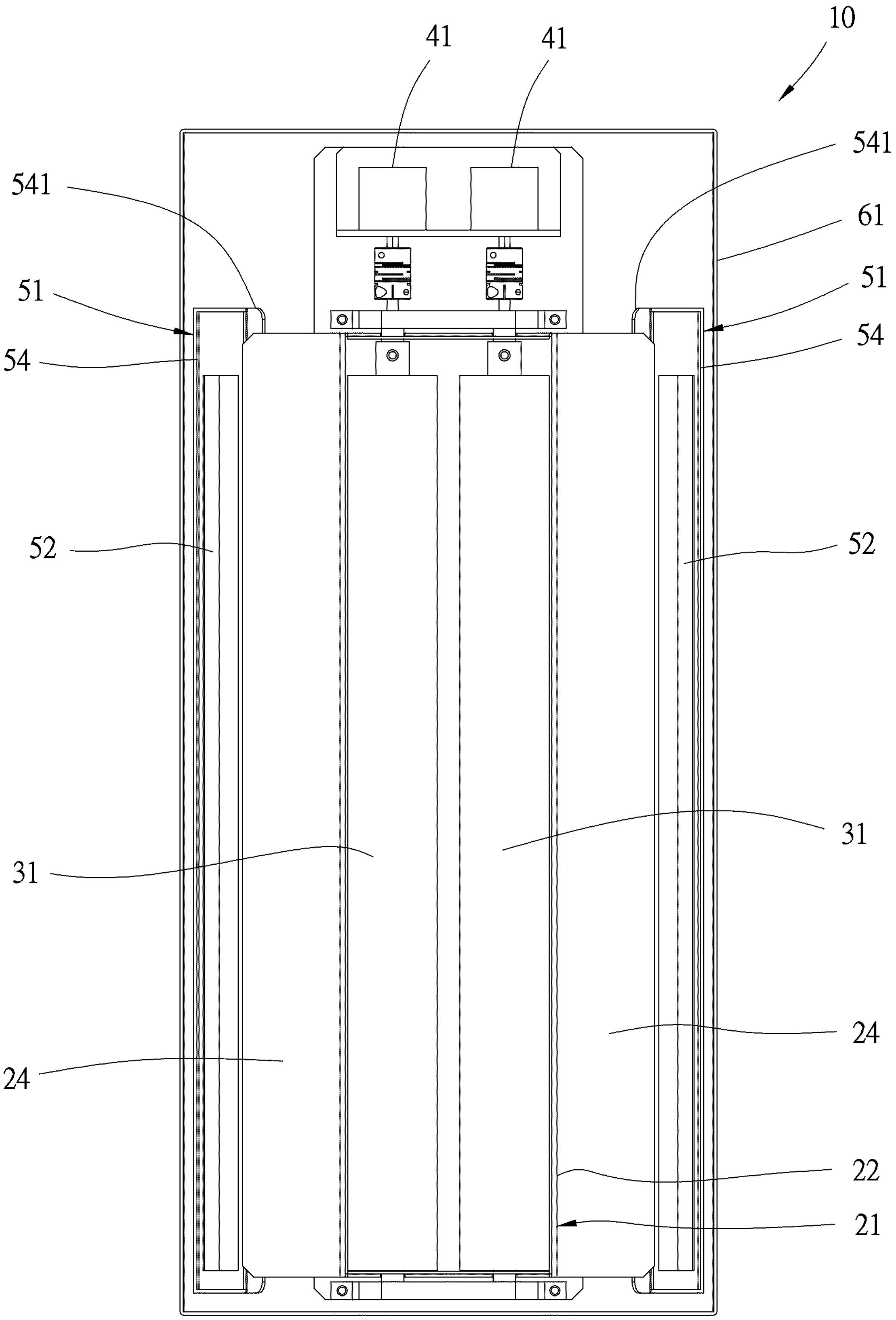
FIG. 3 is a top view according to the first preferred embodiment of the disclosure.

The technical features of the disclosure are herein illustrated with preferred embodiments, depicted with drawings, and described below.

As shown in FIG. 1 through FIG. 5, a preferred embodiment of the disclosure provides a rinsing device 10 for rinsing a blue film at a bottom of a wafer. The rinsing device 10 essentially comprises a base 11, a water tank 21, two drums 31, two drum drivers 41, two vertically-movable scraper sets 51 and a water tray 61.

The water tank 21 is disposed at the base 11, has an opening 22 facing upward, and is adapted to contain clean water (not shown) that serves cleaning purposes.

The two drums 31, with its long axis extending in a front-rear direction, disposed at the water tank 21, wherein a portion of the drums 31 is disposed in the water tank 21, and another portion of the drums 31 is exposed from the opening 22 and vertically protruded from the water tank 21. The two drums 31 are made of sponge and thus have water content. The top ends of the two drums 31 are in contact with a blue film 92 at the bottom of a wafer 91 and rub the blue film 92 to facilitate rinsing.

The two drum drivers 41 are disposed at the base 11, connected to the two drums 31 respectively, and adapted to drive the two drums 31 rotating. In general, from the perspective of driving directions configured as needed, the two drum drivers 41 drive the two drums 31 rotating in opposite directions but, when viewed from above, rotate toward each other. In this situation, the rotation tangential direction at the top end of the drum 31, i.e., the last drum, which the wafer 91 exits is opposite to the movement direction of the wafer 91, regardless of whether the wafer 91 moves leftward or rightward relative to the two drums 31. Alternatively, the two drums 31 can rotate in the same direction, provided that their top-end rotation tangential direction is opposite to the movement direction of the wafer 91. In practice, the two drum drivers 41 are each a motor.

The two vertically-movable scraper sets 51 are disposed at the base 11, flank the water tank 21, and each have a scraper 52, a water collection chamber 54 and a vertically-movable driver 56. The scraper 52 is disposed above the water collection chamber 54. Water drips down from the scraper 52 and then is held by the water collection chamber 54. The water collection chamber 54 is disposed at the vertically-movable driver 56. The vertically-movable driver 56 is disposed at the base 11 and adapted to drive the water collection chamber 54 and the scraper 52 moving vertically. In practice, the vertically-movable drivers 56 are pneumatic cylinders.

The water tray 61 is disposed at the base 11, positioned at the water tank 21, positioned below the two scraper 52 and the two water collection chambers 54, and adapted to hold water dripping down from the two vertically-movable scraper sets 51 and the water tank 21 and all possible dripping water to prevent the escape of water from the water tray 61 during the rinsing process.

In this embodiment, the water tank 21 has two water-delivering conduits 24 extending therefrom laterally respectively and extending downward, a free end of each of the water-delivering conduits 24 is located above a corresponding one of the water collection chambers 54 of the vertically-movable scraper sets 51, the water collection chambers 54 each have a water-receiving conduit 541 extending toward the water tank 21 and obliquely upward, and a top end of each of the water-receiving conduits 541 is located below a corresponding one of the water-delivering conduits 24. The front-rear extension length of the water-delivering conduits 24 is greater than the length of the two drums 31. The front-rear extension length of the water collection chambers 54 is greater than the front-rear extension length of the water-delivering conduits 24. Therefore, when water drips from the blue film 92 at the bottom of the wafer 91 onto the outer side of the water tank 21, the water-delivering conduits 24 hold the water and deliver the water to the water collection chambers 54. The water-receiving conduits 541 further ensure the holding effect on the water dripping down from the water-delivering conduits 24. If the water-delivering conduits 24 and the water-receiving conduits 541 are absent, the dripping water will be directly held by the water tray 61.

Furthermore, regarding the vertically-movable scraper sets 51 in this embodiment, the scrapers 52 are driven by the vertically-movable drivers 56 to move vertically between a highest position H and a lowest position L to allow top edges of the scrapers 52 to be higher than the water tank 21 when the scrapers 52 are at the highest position H and allow the top edges of the scrapers 52 to be lower than the highest position H and lower than the top edges of the drums 31 when the scrapers 52 are at the lowest position L. Owing to the aforesaid mechanism, during a process of rinsing the blue film 92 of the wafer 91, the scrapers 52 act on the blue film 92 and thus impose thereon a water-scraping effect when located at the highest position H but are not in contact with the blue film 92 and thus do not impose thereon any water-scraping effect when located at the lowest position L The structural features of the embodiment of the disclosure are discussed above. The operation states of the embodiment of the disclosure are explained below.

Figure 4:
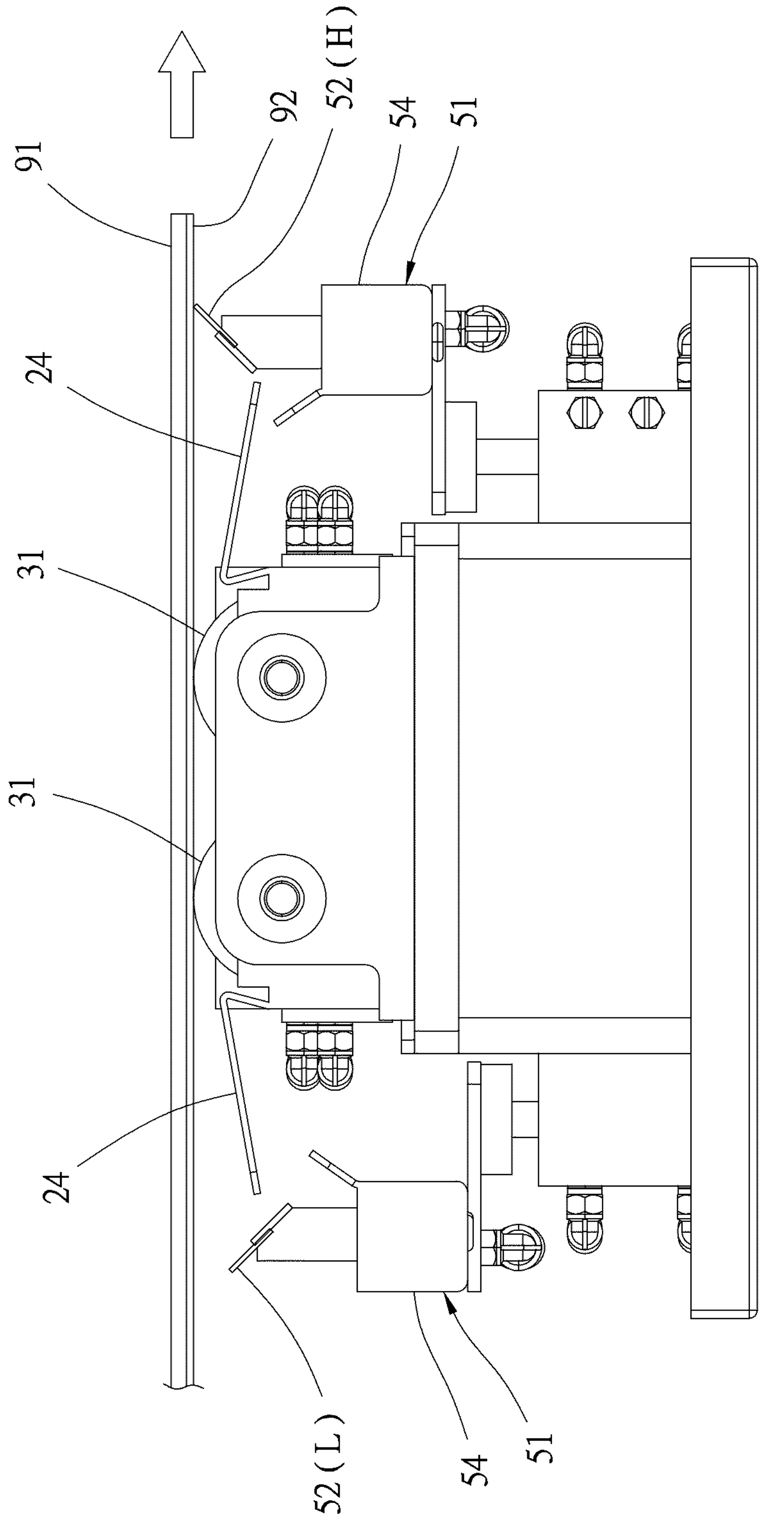
FIG. 4 is an operation schematic view according to the first preferred embodiment of the disclosure.

As shown in FIG. 4, during an inspection, the wafer 91 is moved rightward relative to the rinsing device 10, and the way of moving the wafer 91 is attributed to the prior art and thus is, for the sake of brevity, not reiterated herein. During the process, the blue film 92 at the bottom of the wafer 91 is in contact with the two drums 31 to undergo rinsing, or the wafer 91 is much lower to generate a greater force pressing against the two drums 31 to undergo rinsing. At this point in time, the two drums 31 rub the blue film 92 and thus rinse the blue film 92, allowing satisfactory rubbing and rinsing to be achieved because the two drums 31 rotate in opposite directions. Furthermore, during the process, the scraper 52 of the vertically-movable scraper set 51 on the right controllably ascends to reach the highest position H to scrape water from the blue film 92 which has been rinsed by the two drums 31, whereas the scraper 52 of the vertically-movable scraper set 51 on the left is kept at the lowest position L in order not to scrape water from the blue film 92; the water thus scrapped off flows along the scraper 52 into the water collection chambers 54. During the process, if water drips down from the blue film 92, the water will be mostly delivered by the water-delivering conduits 24 to the water collection chambers 54 respectively, and only a tiny portion of the water will drip onto the water tray 61. The rinsing operation performed on the wafer 91 moving rightward has to persist until the wafer 91 has completely passed the scraper 52 on the right.

Figure 5:
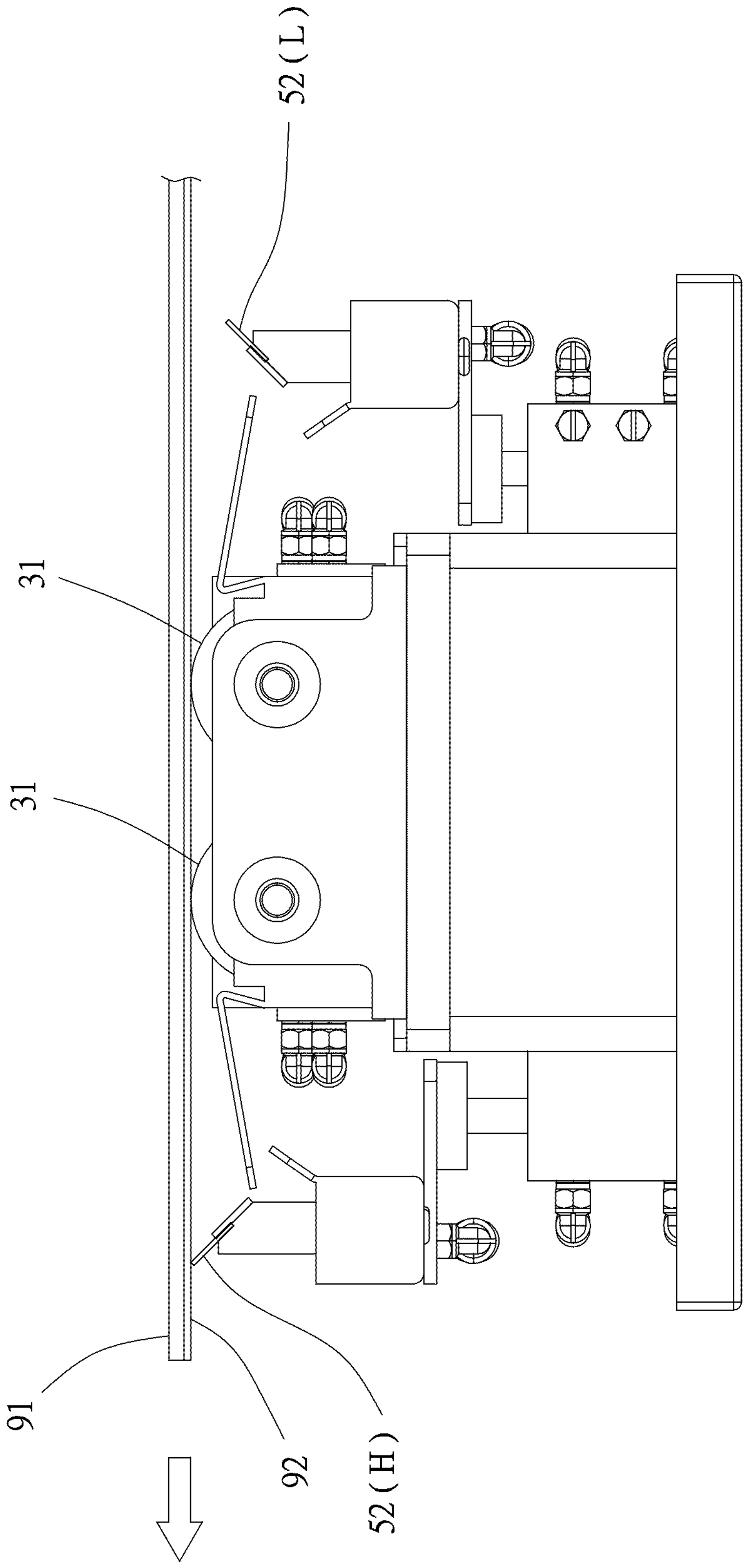
FIG. 5 is another operation schematic view according to the first preferred embodiment of the disclosure.

As shown in FIG. 5, the wafer 91 is moved leftward relative to the rinsing device 10, and the movement is preceded by the controllable descent of the scraper 52 on the right to reach the lowest position L and the controllable ascent of the scraper 52 on the left to reach the highest position H. Therefore, in the course of the movement, the two drums 31 rub and rinse the blue film 92, and the scraper 52 on the right does not scrape water from the blue film 92, but the scraper 52 on the left scrapes water from the blue film 92.

Owing to the leftward and rightward repeated operations shown in FIG. 4 and FIG. 5, multiple instances of rinsing can be performed, and the blue film 92 is being cleaned throughout the whole forward journey and the whole backward journey of the wafer 91 in each instance of rinsing, achieving optimal rinsing efficiency.

Figure 6:
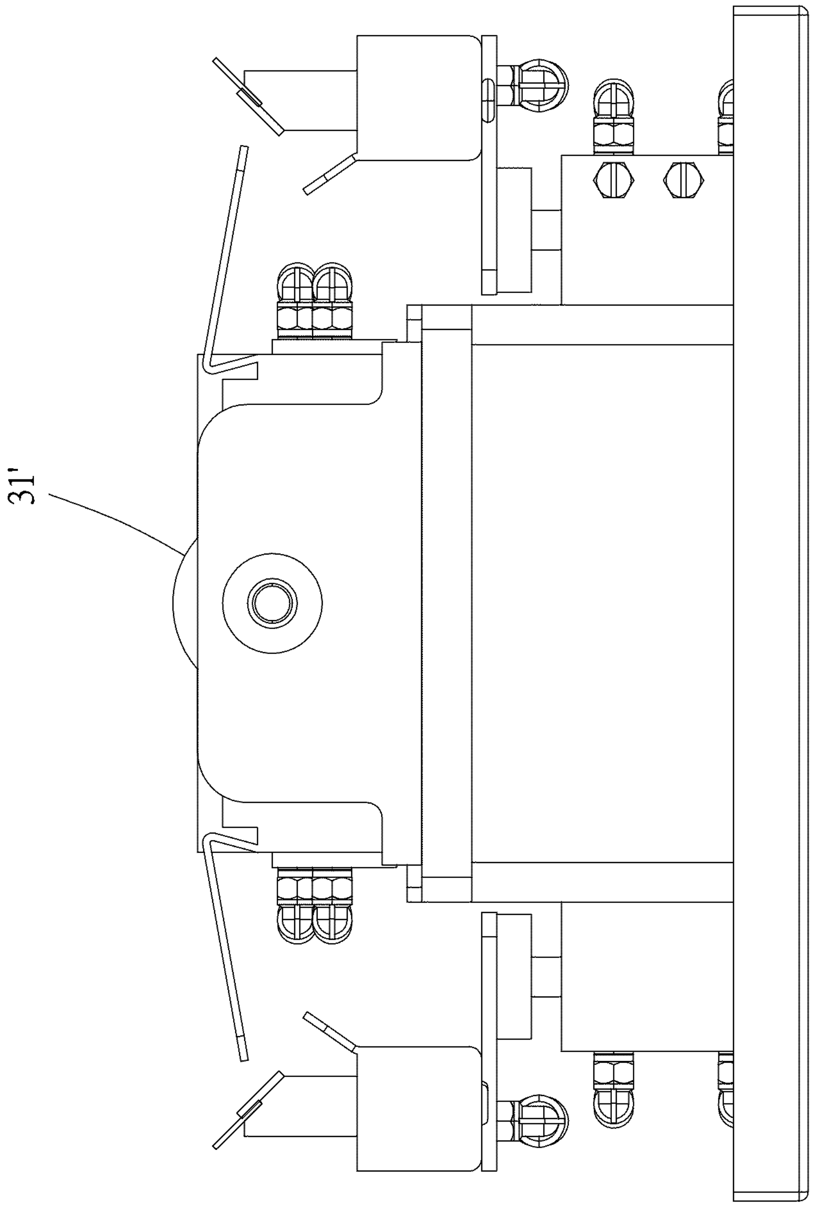
FIG. 6 is a front schematic view of at least one drum according to the first preferred embodiment of the disclosure.

As shown in FIG. 6, the rinsing device 10 requires just one drum 31' and one drum driver (not shown) instead of two drums and two drum drivers. In this situation, the rotation tangential direction at the top end of the drum 31' is opposite to the movement direction of the wafer 91 (shown in the diagram) and still ensures that the drum 31' has a rubbing, rinsing effect on the blue film 92 (shown in the diagram).

The disclosure is disclosed above by embodiments. The embodiments are illustrative of the disclosure but shall not be interpreted as restrictive of the scope of the claims of the disclosure. Thus, all simple variations or equivalent implementation carried out to the aforesaid embodiments according to the claims and detailed description of the disclosure shall be deemed falling within the scope of the claims of the disclosure.

What is claimed is:

1. A rinsing device for rinsing a blue film at a bottom of a wafer, comprising:

- a base;
- a water tank disposed at the base, having an opening facing upward, and adapted to contain water;
- at least one drum, with its long axis extending in a front-rear direction, disposed at the water tank, wherein a portion of the at least one drum is disposed in the water tank, and another portion of the at least one drum is exposed from the opening and vertically protruded from the water tank;
- at least one drum driver disposed at the base, connected to the at least one drum, and adapted to drive the at least one drum rotating;
- two vertically-movable scraper sets disposed at the base, flanking the water tank, and each of the two vertically-movable scraper sets having a scraper, a water collection chamber and a vertically-movable driver, the respective scraper disposed above the respective water collection chamber, and the respective water collection chamber disposed at the respective vertically-movable driver, wherein the respective vertically-movable driver is disposed at the base and adapted to drive the respective water collection chamber and the respective scraper moving vertically; and a water tray disposed at the base, positioned at the water tank, and positioned below the two scrapers and the two water collection chambers.

2. The rinsing device for rinsing a blue film at a bottom of a wafer according to claim 1, wherein the water collection chambers hold water dripped down from along the scrapers.

3. The rinsing device for rinsing a blue film at a bottom of a wafer according to claim 1, wherein the water tray holds water dripped down from the two vertically-movable scraper sets and the water tank.

4. The rinsing device for rinsing a blue film at a bottom of a wafer according to claim 1, wherein the water tank has two water-delivering conduits extending therefrom laterally respectively and extending downward, a free end of each of the water-delivering conduits is located above a corresponding one of the water collection chambers, the water collection chambers each have a water-receiving conduit extending toward the water tank and obliquely upward, and a top end of each of the water-receiving conduits is located below a corresponding one of the water-delivering conduits.

5. The rinsing device for rinsing a blue film at a bottom of a wafer according to claim 4, wherein a front-rear extension length of the water-delivering conduits is greater than a length of the at least one drum, and a front-rear extension length of the water collection chambers is greater than a front-rear extension length of the water-delivering conduits.

6. The rinsing device for rinsing a blue film at a bottom of a wafer according to claim 1, wherein the at least one drum is in the number of two and parallel, the at least one drum driver is in the number of two and connected to the two drums respectively, and the two drums driven by the two drum drivers rotate in opposite directions but, when viewed from above, rotate toward each other.

7. The rinsing device for rinsing a blue film at a bottom of a wafer according to claim 1, wherein the at least one drum is made of sponge.

8. The rinsing device for rinsing a blue film at a bottom of a wafer according to claim 1, wherein the scrapers of the vertically-movable scraper sets move vertically between a highest position and a lowest position, and top edges of the scrapers are higher than the water tank when the scrapers are at the highest position but lower than the highest position and lower than top edges of the drums when the scrapers are at the lowest position.

* * * * *